(12) United States Patent
Lassagne et al.

(10) Patent No.: US 12,148,939 B2
(45) Date of Patent: Nov. 19, 2024

(54) ENERGY STORAGE UNIT COMPRISING A BATTERY MODULE AND METHOD FOR MANAGING SUCH AN ENERGY STORAGE UNIT (71) Applicant: VERKOR, Grenoble (FR)

(72) Inventors: Adrien Lassagne, Revel (FR); Gilles Moreau, Grenoble (FR)

(73) Assignee: VERKOR, Grenoble (FR)

( * ) Notice: Subject to any disclaimer, the term of this patent is extended or adjusted under 35 U.S.C. 154(b) by 0 days.

(21) Appl. No.: 18/269,030

(22) PCT Filed: Dec. 15, 2021

(86) PCT No.: PCT/FR2021/052340
§ 371 (c)(1),
(2) Date: Jun. 22, 2023

(87) PCT Pub. No.: WO2022/136770
PCT Pub. Date: Jun. 30, 2022

(65) Prior Publication Data
US 2024/0047801 A1 Feb. 8, 2024

(30) Foreign Application Priority Data
Dec. 23, 2020 (FR) .................................... 20/14022

(51) Int. Cl.
*H02J 7/00* (2006.01)
*H01M 4/58* (2010.01)
(Continued)

(52) U.S. Cl.
CPC ....... *H01M 50/204* (2021.01); *H01M 4/5825* (2013.01); *H01M 10/0525* (2013.01);
(Continued)

(58) Field of Classification Search
CPC ............. H01M 50/204; H01M 4/5825; H01M 2010/4271; H01M 2010/4278;
(Continued)

(56) References Cited

U.S. PATENT DOCUMENTS 10,938,221 B1 * 3/2021 Tenorio ................. H02J 7/0047
2015/0086811 A1 * 3/2015 Takami ............. H01M 10/4207
429/7

FOREIGN PATENT DOCUMENTS

CN 103378650 A 10/2013
CN 105552341 A 5/2016
(Continued)

OTHER PUBLICATIONS

International Search Report for corresponding application PCT/FR2021/052340 filed Dec. 15, 2021; Mail date Apr. 4, 2022.

*Primary Examiner* — Zixuan Zhou
(74) *Attorney, Agent, or Firm* — CANTOR COLBURN LLP (57) ABSTRACT

The invention relates to a battery module (10) comprising a module management system (11) and at least one battery cell (30) having a cell voltage. The at least one battery cell (30) is capable of assuming: —a first operating mode (Mod1) in which the battery cell (30) undergoes discharge, —a second operating mode (Mod2) in which the battery cell (30) does not undergo discharge. The module management system (11) is configured to decide to place the battery cell (30) selectively in one of the operating modes (Mod1, Mod2) depending on the cell voltage. The invention also relates to an energy storage unit (1) comprising at least two of said battery modules (10). Finally, the invention relates to a method for managing such an energy storage unit (1).

15 Claims, 3 Drawing Sheets

(51) Int. Cl.
  *H01M 10/0525*  (2010.01)
  *H01M 10/44*  (2006.01)
  *H01M 50/204*  (2021.01)
  *H01M 4/02*  (2006.01)
  *H01M 10/42*  (2006.01)

(52) U.S. Cl.
  CPC ....... *H01M 10/441* (2013.01); *H01M 10/446* (2013.01); *H01M 10/448* (2013.01); *H01M 2004/028* (2013.01); *H01M 2010/4271* (2013.01); *H01M 2010/4278* (2013.01)

(58) Field of Classification Search
  CPC ....... H01M 2004/028; H01M 10/0525; H01M 10/441; H01M 10/446; H01M 10/448
  USPC ........................................................ 320/137
  See application file for complete search history.

(56) References Cited

FOREIGN PATENT DOCUMENTS

| | | | |
|---|---|---|---|
| JP | 2013223423 | A | 10/2013 |
| KR | 20140051881 | A | 5/2014 |
| WO | 2020026058 | A1 | 2/2020 |

\* cited by examiner

ENERGY STORAGE UNIT COMPRISING A BATTERY MODULE AND METHOD FOR MANAGING SUCH AN ENERGY STORAGE UNIT

TECHNICAL FIELD OF THE INVENTION

The present invention concerns a battery module comprising a module management system.

The invention also relates to an energy storage unit comprising at least one such battery module and a battery management system.

The invention also concerns a method for managing an energy storage unit.

STATE OF THE ART

The invention finds an application in the field of the storage of the electrical energy and in particular in that of the batteries. More and more systems or devices use batteries to store electrical energy in order to use it to operate said device or system. Particularly, the vehicles such as automobiles, buses, or bicycles increasingly carry batteries in order to provide electric propulsion or to operate ancillary devices present on board the vehicle. The batteries may also be used to power electrical networks, such as residential electrical networks or a "V2G" (for "Vehicle-To-Grid") network.

The result of these different electrical energy needs is a highly variable demand for electrical power. To respond to this demand, different sizes and different active materials are used at the level of the battery. It is possible, for example, to use a first active material to respond to a power biasing, for example at start-up or for overtaking the vehicle carrying the battery, or for a service to the "V2G" network. Alternatively, it is possible to use a second active material, intended to be used during an energy biasing, that is to say a biasing intended to be present over a longer duration than for the aforementioned power biasing, and for example with a view to ensuring the autonomy function of the vehicle, or for a service to the V2G network of the erasure type.

It is known from the prior art to use two different types of active materials, that is to say two types of chemistries constitutive of the battery cells. The cells of each type may for example be grouped together by modules or group of modules and be controlled by a dedicated management system (also known as the "BMS" for "Battery Management System"). A general management system, also known as the "Master BMS", is also present to control the entire battery or batteries. Thus, the total storage unit consists of one or more batteries, each of these batteries being dedicated specifically to the demand for energy. The management systems are then configured to bias one or the other of the batteries.

These solutions are satisfactory in that they make it possible to respond specifically to the demand for electrical energy of the motor or of the ancillary devices eventually onboard the vehicle. However, these solutions require several battery modules and several BMSs to be onboard within the vehicle, which contributes to increasing the mass, and therefore the total energy consumption of the vehicle. In addition, all the elements necessary for the realization of the battery increases the complexity of the system, and in this way increases the total cost of the vehicle. Finally, depending on the use of the storage system by the user, some cells may be biased more often and more intensely than others, the aging of each cell therefore being unequal and liable to lead to a more rapid obsolescence of the storage system.

Object of the Invention

The object of the present invention is to propose a solution which responds to all or part of the aforementioned problems.

This object may be achieved by providing a battery module comprising a module management system and at least one battery cell having a state of charge which is characterized at least by a cell voltage.

Said at least one battery cell comprises at least one electrode consisting of at least one active material, said at least one active material having a first voltage tray characterized by a first voltage range in a characteristic curve of this active material linking the specific capacitance to the electrical voltage, and a second voltage tray characterized by a second voltage range in said characteristic curve.

Said at least one battery cell is capable of occupying:
a first operating mode in which the battery cell undergoes a discharge,
a second operating mode in which the battery cell does not undergo a discharge.

The module management system is configured to decide to place the battery cell selectively in an operating mode chosen from among said first and second operating modes depending on the cell voltage of said at least one battery cell.

That is, the module management system uses the cell voltage of said at least one battery cell to decide to place the battery cell in the first operating mode and/or to decide to place the battery cell in the second operating mode. It is therefore understood that the cell voltage of the battery cell is used as a decision criterion by the module management system to selectively place the battery cell in one of said first and second operating modes.

In other words, the module management system may decide to subject the at least one battery cell to a discharge (according to the first operating mode), or not to subject the at least one battery cell to a discharge (according to the second operating mode), depending on its state of charge, by determining its cell voltage. Advantageously, the module management system may therefore choose to subject the at least one battery cell to a discharge depending on the value of its cell voltage with respect to the first and second voltage ranges.

The arrangements previously described make it possible to propose a battery module in which each battery cell may undergo a discharge depending on its state of charge. Advantageously, the presence of at least one active material having two distinct voltage trays makes it possible to bias the battery cell differently depending on the voltage tray on which the active material is placed during the selection of the operating mode.

The battery module may further have one or more of the following characteristics, taken alone or in combination.

According to one embodiment, the cell voltage is the voltage measured across the corresponding battery cell.

According to one embodiment, the active material constituting the electrode of the battery cell has an olivine-type structure.

According to one embodiment, the olivine-type structure corresponds to a formula $LiFe_zY_{1-z}PO_4$, where $0<z<1$, and where Y is a chemical element chosen from the group comprising manganese, nickel and cobalt.

Advantageously, the value of z may be modified by modifying the molar fraction of iron atoms, or of atoms of the element Y. In this way, it is possible to modify the length of the first voltage tray and/or of the second voltage tray.

According to one embodiment, the module management system is configured to decide to place the battery module in the first or the second operating mode depending on the number of electrons that may be released by the biasing of the electrochemical sites corresponding to a species characteristic of one of the voltage trays.

In particular, when the structure of the active material is an olivine-type structure, the active material may have a first voltage tray corresponding to the electrochemical potentials of the iron atoms, and a second voltage tray corresponding to the electrochemical potentials of the atoms Y, as manganese. In this case, when the cell voltage of the battery cell corresponds to a voltage comprised within the first voltage range, the battery module may decide to place the battery cell in the first operating mode to respond to a demand for high electrical power, which is particularly suitable for the structure comprising the iron atoms. Alternatively, when the cell voltage of the battery cell corresponds to a voltage comprised within the second voltage range, the battery module may decide to place the battery cell in the first operating mode to respond to a demand for electrical energy over the duration, which is particularly suitable for the structure comprising manganese atoms. Thus, and advantageously, the module management system is capable of selectively placing the battery cell in the first operating mode or the second operating mode depending on the type of demand for energy (over the duration or over a short time interval).

According to one embodiment, the first voltage range is comprised between 3.2 V and 3.6 V with respect to the reference potential constituted by the electrochemical couple $Li^+/Li$, and more particularly comprised between 3.3 V and 3.5 V with respect to the reference potential constituted by the electrochemical couple $Li^+/Li$, while the second voltage range is comprised between 3.7 V and 4.3 V with respect to the reference potential constituted by the electrochemical couple $Li^+/Li$, and more particularly comprised between 3.8 V and 4.1 V with respect to the reference potential constituted by the electrochemical couple $Li^+/Li$.

According to one embodiment, the module management system is configured to measure the cell voltage of the battery cell.

According to one embodiment, the module management system is configured to measure a state of health level of the battery cell, the module management system being further configured to decide to place said battery cell selectively in an operating mode chosen from among said first and second operating modes depending on said state of health level of the battery cell.

It is therefore well understood that the state of health level is a decision criterion for placing the battery cell in one of said first and second operating modes.

According to one embodiment, the battery module comprises a plurality of battery cells, where each battery cell has an individual cell voltage distinct from the cell voltages of the other battery cells, the module management system being configured to decide to place each battery cell of the plurality of battery cells selectively in an operating mode chosen from among said first and second operating modes depending on the individual cell voltage of this battery cell.

According to one embodiment, the module management system is configured to decide to place each battery cell selectively in an operating mode chosen from among the first and second operating modes depending on a strategy algorithm recorded in a memory of the module management system.

The object of the invention may also be achieved by providing an energy storage unit comprising at least two battery modules of the type of one of those described above, and a battery management system configured to control each of the module management systems of said at least two battery modules, depending on a demand for power coming from an external system.

Finally, the object of the invention may be achieved thanks to the implementation of a method for managing an energy storage unit, comprising a plurality of battery modules whose number is greater than or equal to two, wherein each battery module of the plurality of battery modules comprises a module management system and at least one battery cell that has a state of charge characterized at least by a cell voltage.

In this management method, said at least one battery cell comprises at least one electrode consisting of at least one active material, said at least one active material having a first voltage tray characterized by a first voltage range in a characteristic curve of this active material linking the specific capacitance to the electrical voltage, and a second voltage tray characterized by a second voltage range in said characteristic curve.

The management method comprises:
- a step of receiving a demand for power coming from an external system;
- a step of determining, for at least one battery cell among said at least one battery cell, a cell voltage of this battery cell;
- a step of biasing this battery cell selectively in a first operating mode in which the battery cell undergoes a discharge, or in a second operating mode in which the battery cell does not undergo a discharge, depending on the demand for power and the cell voltage of this battery cell.

The arrangements previously described make it possible to propose a battery management method capable of placing a battery cell in a voltage situation depending on its cell voltage and the demand for power from an external system. Thus, and advantageously, given the presence of two voltage trays for the active material constituting the electrode of the battery cell, it is possible to bias the battery cell selectively depending on the voltage tray on which said battery cell is placed at a given time.

The management method may also have one or more of the following characteristics, taken alone or in combination.

According to one embodiment, the external system from which the demand for power originates is an external motorization system.

According to one embodiment, the module management system is configured to measure a cell voltage of the battery cell, the step of determining the cell voltage comprising measuring the cell voltage of said battery cell.

According to one embodiment, the management method is implemented by the module management system.

According to one embodiment, the active material constituting the electrode of the battery cell has an olivine-type structure.

According to one embodiment, the olivine-type structure corresponds to a formula $LiFe_zY_{1-z}PO_4$, where $0<z<1$, and where Y is a chemical element chosen from the group comprising manganese, nickel and cobalt.

Advantageously, the value of z may be modified by modifying the molar fraction of iron atoms, or of atoms of the element Y. In this way, it is possible to modify the length of the first voltage tray and/or or of the second voltage tray.

In particular, when the structure of the active material is an olivine-type structure, the active material may have a first voltage tray corresponding to the electrochemical potentials of the iron atoms, and a second voltage tray corresponding to the electrochemical potentials of the atoms Y, as manganese. In this case, when the cell voltage of the battery cell corresponds to a voltage comprised within the first voltage range, the step of biasing the battery cell may make it possible to place the battery cell in the first operating mode to respond to a demand for high electrical power, which is particularly suitable for the structure comprising the iron atoms. Alternatively, when the cell voltage of the battery cell corresponds to a voltage comprised within the second voltage range, the step of biasing the battery cell may make it possible to place the battery cell in the first operating mode to respond to a demand for electrical energy over the duration, which is particularly suitable for the structure comprising the manganese atoms. Thus, and advantageously, the management method is capable of selectively placing the battery cell in the first operating mode or in the second operating mode depending on the type of demand for energy (over the duration or over a short time interval).

According to one embodiment, the first voltage range is comprised between 3.2 V and 3.6 V with respect to the reference potential constituted by the electrochemical couple $Li^+/Li$, and more particularly comprised between 3.3 V and 3.5 V with respect to the reference potential constituted by the electrochemical couple $Li^+/Li$, and in which the second voltage range is comprised between 3.7 V and 4.3 V with respect to the reference potential constituted by the electrochemical couple $Li^+/Li$, and more particularly comprised between 3.8 V and 4.1 V with respect to the reference potential constituted by the electrochemical couple $Li^+/Li$.

According to one embodiment, the management method further comprises a step of comparing the demand for power with a predetermined high threshold power, and with a predetermined low threshold power, the biasing step further comprising the following steps:
  placing the battery cell in the first operating mode in the case where the cell voltage of the battery cell corresponds to a voltage which is comprised within the first voltage range, and where the demand for power is greater than or equal to the high threshold power;
  placing the battery cell in the first operating mode in the case where the cell voltage of the battery cell corresponds to a voltage which is comprised within the second voltage range, and where the demand for power is strictly comprised between the high threshold power and the low threshold power;
  placing the battery cell in the second operating mode otherwise.

According to one embodiment, the high threshold power corresponds to the power required to completely discharge all the battery cells, in one hour, when said battery cells are fully charged.

According to one embodiment, the low threshold power is equal to 0 W.

According to one embodiment, the management method is implemented for each battery cell among the at least one battery cell. In other words, if one battery module of the plurality of battery modules comprises a plurality of battery cells, the management method may be implemented for each battery cell of said plurality of battery cells.

According to one embodiment for which a battery module of the plurality of battery modules comprises a number of battery cells greater than or equal to two, the biasing step may further comprise the following steps:
  placing the battery cell in the first operating mode in the case where the cell voltage of the battery cell corresponds to a voltage which is comprised within the first voltage range, and where the demand for power is strictly comprised between the high threshold power and the low threshold power, and where no other battery cell of said battery module has a cell voltage which corresponds to a voltage which is comprised within the second voltage range;
  placing the battery cell in the first operating mode in the case where the cell voltage of the battery cell corresponds to a voltage which is comprised within the second voltage range, and where the demand for power is greater than or equal to the high threshold power, and where no other battery cell of said battery module has a cell voltage which corresponds to a voltage which is comprised within the first voltage range.

According to one embodiment, the management method may comprise a step of transmitting discharge information. For example, said step of transmitting discharge information may be transmitted to a user interface when all the battery cells of a battery module of the plurality of battery modules have a cell voltage lower than a minimum cell voltage. Said minimum cell voltage may for example correspond to a state of charge, that is to say the quantity of energy remaining in the cell, which may be less than 10% or more particularly less than 5%.

According to one embodiment, the management method further comprises a step of measuring a state of health level of the at least one battery cell, the biasing step being implemented depending on the state of health level of the battery cell.

According to one embodiment, the module management system is configured to measure said state of health level of the at least one battery cell during the step of measuring a state of health level.

According to one embodiment, the battery module comprises a plurality of battery cells, where each battery cell has an individual cell voltage distinct from the cell voltages of the other battery cells, the biasing step being implemented for all or part of the battery cells of said plurality of battery cells, depending on the demand for power, and the individual cell voltage of each battery cell.

According to one embodiment, the battery modules of the plurality of battery modules whose number is greater than or equal to two, are divided into a first group of battery modules and into a second group of battery modules, each group of battery modules comprising at least one of the plurality of battery modules, the energy storage unit further comprising a battery management system configured to control each module management system, the management method comprising a step of selecting a group of battery modules from among the first and second groups of battery modules, wherein only one of the first group of battery modules or of the second group of battery modules implements the biasing step.

According to one embodiment, the management method is implemented by the battery management system.

According to one embodiment, the management method further comprises the following steps, implemented by the battery management system:
  a step of receiving a state of health level of the first group of battery modules;
  a step of receiving a state of health level of the second group of battery modules;

the step of selecting a group of modules then being implemented depending on said states of health of the first and second groups of battery modules.

According to one embodiment, each module management system is configured to measure a state of health level of a battery module which is comprised in the energy storage unit, the management method comprising:
- a step of determining a state of health level of at least one battery module of the first group of battery modules, implemented by each module management system of the first group of battery modules on each battery module of the first group of battery modules;
- a step of determining a state of health level of at least one battery module of the second group of battery modules, implemented by each module management system of the second group of battery modules on each battery module of the second group of battery modules;
- a step of transmitting said states of health determined by said module management systems to the battery management system.

According to one embodiment, the step of determining a state of health level of at least one battery module of the first group of battery modules and/or of the second group of battery modules comprises measuring the temperature of said at least one battery module of the first group of battery modules and/or of the second group of battery modules.

According to one embodiment, the steps of determining a state of health level of at least one battery module of the first group of battery modules and/or of the second group of battery modules comprise measuring a cell voltage of each battery cell comprised in said at least one battery module of the first group of battery modules and/or of the second group of battery modules.

According to one embodiment, the steps of determining a state of health level of at least one battery module of the first group of battery modules and/or of the second group of battery modules comprise measuring one or more parameters comprised in the group consisting of the temperature, the internal resistance of the cells, the voltage measured across one or more of the battery modules, the number of charge/discharge cycles carried out by the battery cells constituting said at least one battery module.

According to one embodiment, the steps of determining a state of health level of at least one battery module of the first group of battery modules and/or of the second group of battery modules are carried out by determining an average state of health level of each battery cell constituting a battery module.

BRIEF DESCRIPTION OF THE DRAWINGS

Other aspects, objects, advantages and characteristics of the invention will appear better on reading the following detailed description of preferred embodiments thereof, given by way of non-limiting example, and made with reference to the appended drawings on which.

DETAILED DESCRIPTION

In the figures and in the remainder of the description, the same references represent identical or similar elements. In addition, the different elements are not represented to scale so as to favor the clarity of the figures. Furthermore, the different embodiments and variants are not mutually exclusive and may be combined with each other.

Figure 1:
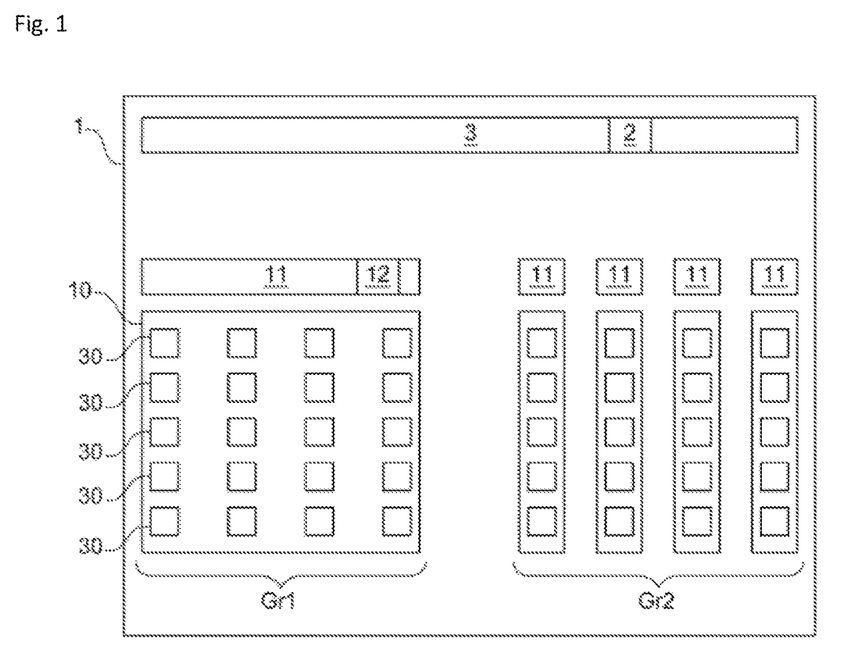
FIG. 1 is a schematic view of an energy storage unit according to a particular embodiment of the invention.

As illustrated in FIG. 1, the invention first concerns a battery module 10 comprising a module management system 11 and at least one battery cell 30. The invention also concerns an energy storage unit 1 comprising at least two battery modules 10, and a battery management system 3 configured to control each of the module management systems 11 of said at least two battery modules 10, depending on a demand for power coming from an external system, for example a motorization system. FIG. 1 illustrates in particular a particular embodiment in which the energy storage unit 1 comprises a plurality of battery modules 10 whose number is greater than or equal to two, and for example equal to 5. The battery modules 10 are divided into a first group of battery modules Gr1 and into a second group of battery modules Gr2, each group of battery modules Gr1, Gr2 comprising at least one of the battery modules 10 of the plurality of battery modules 10. According the represented embodiment, the first group of battery modules Gr1 comprises one battery module 10 and the second group of battery modules Gr2 comprises four battery modules 10. It goes without saying that the number of battery modules 10 per group of battery modules may be higher or lower than this example, and possibly be similar between the groups of battery modules Gr1, Gr2.

As previously indicated, each battery module 10 comprises a module management system 11 and at least one battery cell 30. Said module management system 11 may comprise a memory 12 in which a strategy algorithm may be recorded. Alternatively, the battery management system 3 may be configured to control one or more of the module management systems 11, in particular thanks to a strategy algorithm recorded in a memory 2 of the battery management system.

Figure 2:
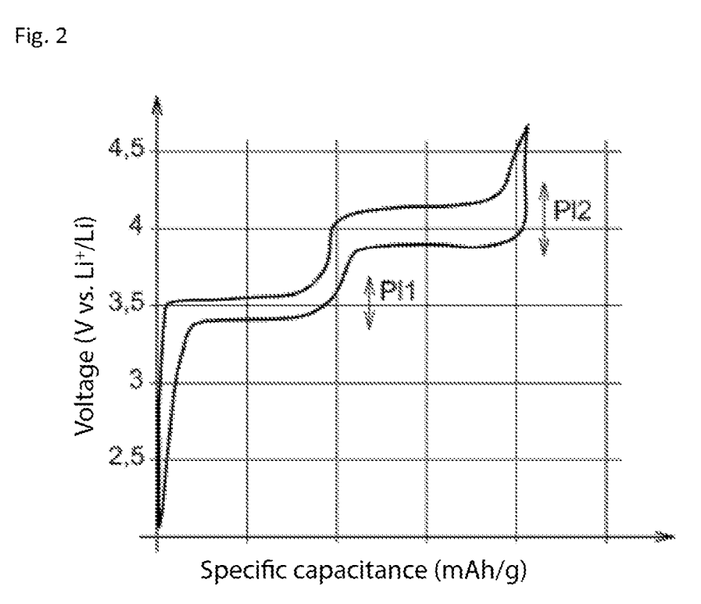
FIG. 2 is a characteristic curve linking the specific capacitance to the electrical voltage of an active material constituting a battery cell electrode according to a particular embodiment of the invention.
Figure 3:
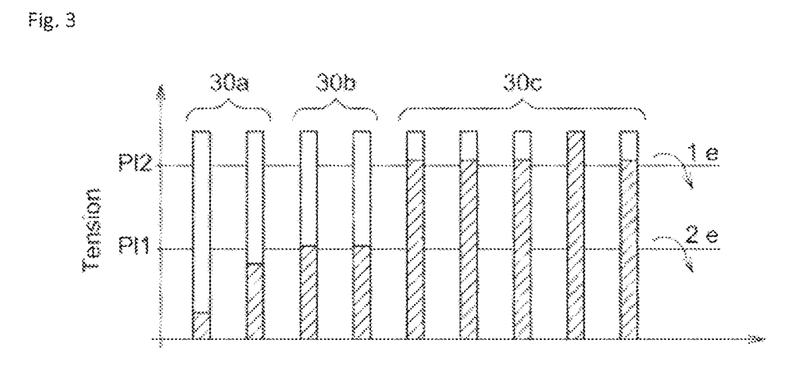
FIG. 3 is a schematic view showing cell voltages of battery cells according to a particular embodiment of the invention.

As illustrated in FIGS. 2 and 3, the at least one battery cell 30 has a state of charge which is characterized at least by a cell voltage. Said at least one battery cell 30 also comprises at least one electrode consisting of at least one active material, said at least one active material having a first voltage tray characterized by a first voltage range P11, and a second voltage tray characterized by a second voltage range Pl2. FIG. 2 notably illustrates a characteristic curve of this active material linking the specific capacitance to the electrical voltage. The active material constituting the electrode of the battery cell 30 may in particular have an olivine-type structure. For example, the olivine-like structure may correspond to a formula $LiFe_zY_{1-z}PO_4$, where $0<z<1$, and where Y is a chemical element chosen from the group comprising manganese, nickel and cobalt. Advantageously, the value of z may be modified by modifying the molar fraction of iron atoms, or of atoms of the element Y. In this way, it is possible to modify the length of the first voltage tray and/or of the second voltage tray. According to this non-limiting embodiment, the first voltage range P11 is comprised between 3.2 V and 3.6 V with respect to the reference potential constituted by the electrochemical couple $Li^+/Li$, and more particularly comprised between 3.3 V and 3.5 V with respect to the reference potential constituted by the electrochemical couple $Li^+/Li$. Furthermore, according to this embodiment, the second voltage range Pl2 is comprised between 3.7 V and 4.3 V with respect to the reference potential constituted by the electrochemical couple $Li^+/Li$, and more particularly comprised between 3.8 V and 4.1 V with respect to the reference potential constituted by the electrochemical couple $Li^+/Li$.

Said at least one battery cell 30 is further capable of occupying a first operating mode Mod1 in which the battery cell 30 undergoes a discharge, or a second operating mode Mod2 in which the battery cell 30 does not undergo a discharge. The module management system 11 is configured to decide to place the battery cell 30 selectively in an operating mode chosen from among said first and second operating modes Mod1, Mod2 depending on the cell voltage of said at least one battery cell 30. That is, the module management system 11 uses the cell voltage of said at least one battery cell 30 to decide to place the battery cell 30 in the first operating mode Mod1 and/or to decide to place the battery cell 30 in the second operating mode Mod2. It is therefore well understood that the cell voltage of the battery cell is used as a decision criterion by the module management system 11 to selectively place the battery cell 30 in one of said first and second operating modes Mod1, Mod2. In particular, when the structure of the active material is an olivine-type structure, the active material may have a first voltage tray corresponding to the electrochemical potentials of the sites of the iron atoms, and a second voltage tray corresponding to the electrochemical potentials of the sites of the atoms Y, as manganese. In this case, when the cell voltage of the battery cell 30 corresponds to a voltage comprised within the first voltage range P11, the battery module 10 may decide to place the battery cell 30 in the first operating mode Mod1 to respond to a demand for high electrical power, which is particularly suitable for the structure comprising the iron atoms. Alternatively, when the cell voltage of the battery cell 30 corresponds to a voltage comprised within the second voltage range Pl2, the battery module 10 may decide to place the battery cell 30 in the first operating mode Mod1 to respond to a demand for electrical energy over the duration, which is particularly suitable for the structure comprising the manganese atoms. Thus, and advantageously, the module management system 11 is capable of selectively placing the battery cell 30 in the first operating mode Mod1 or the second operating mode Mod2 depending on the type of demand for energy.

FIG. 3 illustrates one embodiment in which a battery module 10 comprises a plurality of battery cells 30, wherein each battery cell 30 has an individual cell voltage distinct from the cell voltages of the other battery cells 30. In particular, FIG. 3 shows a battery module 10 comprising nine battery cells 30 having an individual cell voltage. A first group of battery cells notably has a cell voltage corresponding to a voltage strictly lower than the first voltage range P11. A second group of battery cells 30b has a cell voltage corresponding to a voltage comprised between the first voltage range P11 and the second voltage range Pl2. A third group of battery cells 30c has a cell voltage corresponding to a voltage strictly higher than the second voltage range Pl2. As previously indicated, and advantageously, if the demand for power from the external system is high, the module management system 11 may decide to place the second group of battery cells 30b in the first operating mode Mod1, so as to release more electrons in a determined time. On the other hand, if the demand for power from the external system is lower, the module management system 11 may decide to place the third group of battery cells in the first operating mode Mod1 to extend the release of electrons over time. The electrochemical sites of the active material of the electrode of the battery cell 30 are therefore selectively biased to respond to a precise demand for electrical energy. The biasing of the battery cells 30 is therefore suitable for their operation, which makes it possible to improve the efficiency of the battery, while improving the service life of the battery cells 30.

As indicated above, the module management system 11 is configured to decide to place each battery cell 30 of the plurality of battery cells 30 selectively in an operating mode chosen from among said first and second operating modes Mod1, Mod2 depending on the individual cell voltage of this battery cell 30. The module management system 11 may also be configured to measure said cell voltage of the battery cell 30. According to one non-limiting variant, the module management system 11 is configured to measure a state of health SoH level of the battery cell 30. In this case the module management system 11 may be configured to decide to place said battery cell 30 selectively in an operating mode chosen from among said first and second operating modes Mod1, Mod2 depending on said state of health SoH level of the battery cell 30. It is therefore well understood that the state of health SoH level is a decision criterion for placing the battery cell 30 in one of said first and second operating modes Mod1, Mod2. Said state of health level of the battery cell 30 may in particular be determined by measuring one or more parameters comprised in the group consisting of the temperature of the battery cell 30, the electrical voltage measured across the cell battery 30, the number of charge/discharge cycles carried out by the battery cell 30, the internal resistance of the battery cell 30. Finally, the module management system 11 may be configured to decide to place each battery cell 30 selectively in an operating mode chosen from among the first and second operating modes Mod1, Mod2 depending on a strategy algorithm recorded in the memory 12 of the module management system 11. An example of a strategy algorithm is described below in reference to FIG. 6.

According to one particular embodiment, the battery management system 3 may be configured to control each module management system 11. It is therefore clearly understood that the battery management system 3 may be configured to transmit instructions intended for the module management systems 11 so as to place the battery cells 30 selectively in at least one of said first and second operating modes Mod1, Mod2.

The arrangements previously described make it possible to propose a battery module 10 in which each battery cell 30 may undergo a discharge depending on its state of charge. Advantageously, the presence of the active material having two distinct voltage trays makes it possible to bias the battery cell 30 differently depending on the voltage tray on which the active material is placed during the selection of the operating mode.

Figure 4:
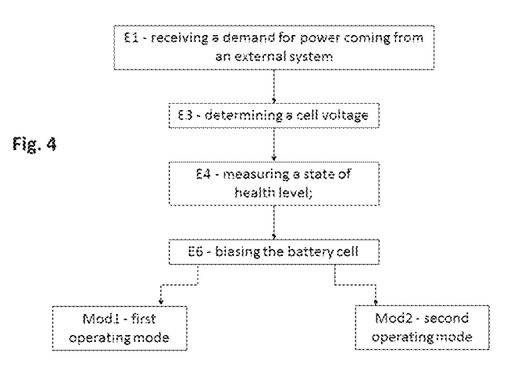
FIG. 4 is a schematic view of a management method according to a particular embodiment of the invention.
Figure 5:
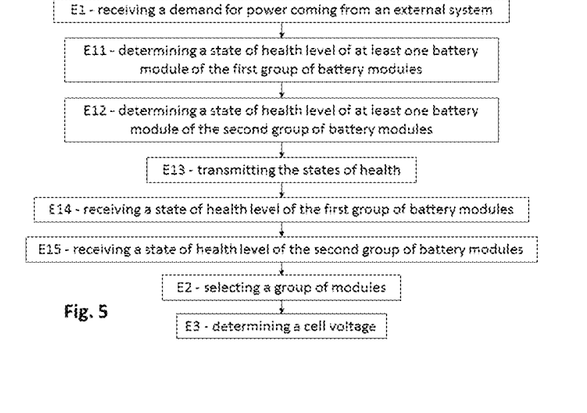
FIG. 5 is a schematic view of certain steps of a management method according to another particular embodiment of the invention.
Figure 6:
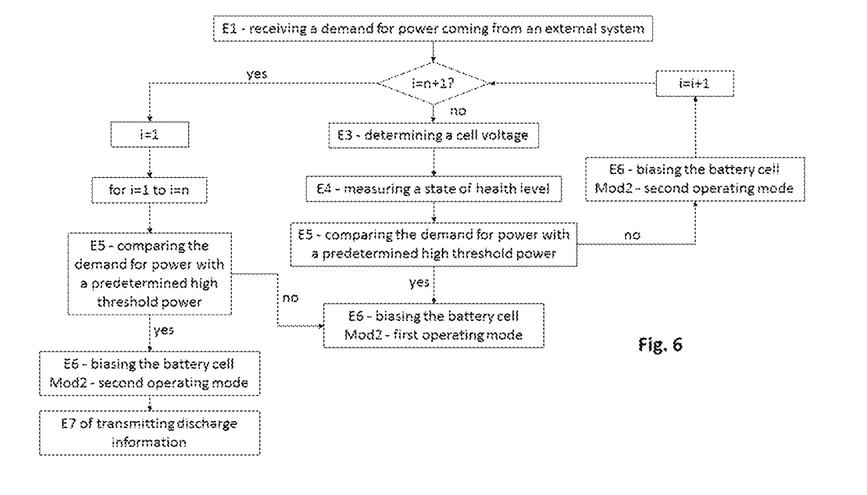
FIG. 6 is a schematic view of a strategy algorithm which may be used in a management method according to a particular embodiment of the invention.

With reference to FIGS. 4 to 6, the invention also concerns a method for managing an energy storage unit 1, comprising a plurality of battery modules 10 whose number is greater than or equal to two. Each battery module 10 of the plurality of battery modules 10 comprises a module management system 11 and at least one battery cell 30. The management method may be implemented by the module management system 11, and comprises first of all a step E1 of receiving a demand for power coming from an external system. For example, the external system may be an external motorization system such as the engine of an electric vehicle.

According to one non-limiting variant, the battery modules 10 of the plurality of battery modules 10 whose number is greater than or equal to two, are divided into a first group of battery modules Gr1 and into a second group of battery modules Gr2, each group of battery modules Gr1, Gr2 comprising at least one of the plurality of battery modules 10. The energy storage unit 1 may also comprise a battery management system 3 configured to control each module management system 11. In this case, the management method may comprise a step E2 of selecting a group of battery modules Gr1, Gr2 among the first and the second groups of battery modules Gr1, Gr2, in which only one of the first group of battery modules Gr1 or of the second group of battery modules Gr2 implements the biasing step E6 described below. According to one embodiment, the management method may therefore be implemented by the battery management system 3. Advantageously, each module management system 11 may be configured to measure a state of health SoH level of a battery module 10 which is comprised in the energy storage unit 1. In this case the management method may comprise:

a step E11 of determining a state of health SoH level of at least one battery module 10 of the first group of battery modules Gr1, implemented by each module management system 11 of the first group of battery modules Gr1 on each battery module 10 of the first group of battery modules Gr1;

a step E12 of determining a state of health SoH level of at least one battery module 10 of the second group of battery modules Gr2, implemented by each module management system 11 of the second group of battery modules Gr2 on each battery module 10 of the second group of battery modules Gr2;

a step E13 of transmitting said states of health determined by said module management systems 11 to the battery management system 3.

According to one embodiment, the steps E11 and E12 of determining a state of health SoH level of at least one battery module 10 of the first group of battery modules Gr1 and/or of the second group of battery modules Gr2 comprise measuring the temperature of said at least one battery module 10 of the first group of battery modules Gr1 and/or of the second group of battery modules Gr2.

According to one embodiment, the steps E11 and E12 of determining a state of health SoH level of at least one battery module 10 of the first group of battery modules Gr1 and/or of the second group of battery modules Gr2 comprise measuring a cell voltage of each battery cell 30 comprised in said at least one battery module 10 of the first group of battery modules Gr1 and/or of the second group of battery modules Gr2.

According to one embodiment, the steps E11 and E12 of determining a state of health SoH level of at least one battery module 10 of the first group of battery modules Gr1 and/or of the second group of battery modules Gr2 comprise determining an average state of health SoH level of each battery cell 30 constituting a battery module 10.

According to the non-limiting variant represented in FIG. 5, the management method may then comprise the following steps, implemented by the battery management system 3:

a step E14 of receiving a state of health level of the first group of battery modules Gr1;

a step E15 of receiving a state of health level of the second group of battery modules Gr2.

In this case, step E2 of selecting a group of modules may be implemented depending on said states of health of the first and second groups of battery modules Gr1, Gr2.

As indicated above, each battery module 10 comprises at least one battery cell 30. Said at least one battery cell 30 has a state of charge characterized at least by a cell voltage. Said at least one battery cell 30 also comprises at least one electrode consisting of at least one active material, said at least one active material having a first voltage tray characterized by a first voltage range Pl1 in a characteristic curve of this active material linking the specific capacitance to the electrical voltage, and a second voltage tray characterized by a second voltage range Pl2 in said characteristic curve. For example, the active material constituting the electrode of the battery cell 30 has an olivine-type structure. The olivine-type structure may in particular correspond to a formula $LiFe_zY_{1-z}PO_4$, where $0<z<1$, and where Y is a chemical element chosen from the group comprising manganese, nickel and cobalt. In this case, the first voltage range Pl1 may be comprised between 3.2 V and 3.6 V with respect to the reference potential constituted by the electrochemical couple $Li^+/Li$, and more particularly comprised between 3.3 V and 3.5 V with respect to the reference potential constituted by the electrochemical couple $Li^+/Li$. In addition, the second voltage range Pl2 may be comprised between 3.7 V and 4.3 V with respect to the reference potential constituted by the electrochemical couple $Li^+/Li$, and more particularly comprised between 3.8 V and 4.1 V with respect to the reference potential constituted by the electrochemical couple $Li^+/Li$.

In general, the management method may be implemented for each battery cell 30 among the at least one battery cell 30. In other words, if a battery module 10 of the plurality of battery modules 10 comprises a plurality of battery cells 30, the management method may be implemented for each battery cell 30 of said plurality of battery cells 30.

The management method further comprises a step E3 of determining, for at least one battery cell 30 among said at least one battery cell 30, a cell voltage of this battery cell 30. The module management system 11 may for example be configured to measure a cell voltage of the battery cell 30. In this case, the step E3 of determining the cell voltage may comprise measuring the cell voltage of said battery cell 30. For example, the measurement of the cell voltage of a battery cell 30 may be carried out by measuring the voltage across the battery cell 30.

The management method may then comprise a step E4 of measuring a state of health SoH level of the at least one battery cell 30. The module management system 11 may in particular be configured to measure said state of health SoH level of the at least one battery cell 30 during step E4 of measuring a state of health SoH level.

The management method may also comprise a step E5 of comparing the demand for power with a predetermined high threshold power, and with a predetermined low threshold power. For example, the high threshold power may correspond to the power required to completely discharge all the battery cells 30, in one hour, when said battery cells 30 are fully charged. The low threshold power may be equal to 0 W.

A step E6 of biasing said at least one battery cell 30 is then implemented. During this biasing step E6, the at least one battery cell 30 is placed selectively in a first operating mode Mod1 in which the battery cell 30 undergoes a discharge, or in a second operating mode Mod2 in which the cell battery cell 30 does not undergo a discharge, depending on the demand for power and the cell voltage of this battery cell 30. The biasing step E6 may also be implemented depending on the state of health SoH level of the battery cell 30. It is therefore well understood that the state of health SoH level, and the cell voltage, are decision criteria for placing the battery cell 30 in one of said first and second operating modes Mod1, Mod2.

In the non-limiting variant in which the comparison step E5 has been implemented, the biasing step E6 may also comprise the following steps:
- placing the battery cell 30 in the first operating mode Mod1 in the case where the cell voltage of the battery cell 30 corresponds to a voltage which is comprised within the first voltage range P11, and where the demand for power is greater than or equal to the high threshold power;
- placing the battery cell 30 in the first operating mode Mod1 in case where the cell voltage of the battery cell 30 corresponds to a voltage which is comprised within the second voltage range Pl2, and where the demand for power is strictly comprised between the high threshold power and the low threshold power;
- placing the battery cell 30 in the second operating mode Mod2 otherwise.

According to one embodiment, the biasing step E6 may further comprise a step of placing the battery cell 30 in the first operating mode Mod1 in the case where the cell voltage of said battery cell 30 corresponds to a voltage which is comprised neither within the second voltage range Pl2 nor within the first voltage range P11, and where the demand for power is strictly greater than the low threshold power.

According to one non-limiting variant in which the battery module 10 comprises a plurality of battery cells 30, where each battery cell 30 has an individual cell voltage distinct from the cell voltages of the other battery cells 30, the biasing step E6 may be implemented for all or part of the battery cells 30 of said plurality of battery cells 30, depending on the demand for power, and the individual cell voltage of each battery cell 30.

Alternatively or jointly, when a battery module 10 of the plurality of battery modules 10 comprises a number of battery cells 30 greater than or equal to two, the biasing step E6 may further comprise the following steps:
- placing the battery cell 30 in the first operating mode Mod1 in the case where the cell voltage of the battery cell 30 corresponds to a voltage which is comprised within the first voltage range P11, and where the demand for power is strictly comprised between the high threshold power and the low threshold power, and where no other battery cell 30 of said battery module 10 has a cell voltage which corresponds to a voltage which is comprised within the second voltage range Pl2;
- placing the battery cell 30 in the first operating mode Mod1 in the case where the cell voltage of the battery cell 30 corresponds to a voltage which is comprised within the second voltage range Pl2, and where the demand for power is greater than or equal to the high threshold power, and where no other battery cell 30 of said battery module 10 has a cell voltage which corresponds to a voltage which is comprised within the first voltage range P11.

According to another embodiment, when a given battery module 10 of the plurality of battery modules 10 comprises a number of battery cells 30 greater than or equal to two, the biasing step E6 may further comprise a step of placing all the battery cells 30 of said given battery module 10 in the first operating mode Mod1 in the case where the cell voltage of at least one battery cell 30 among the battery cells 30 of said given battery module 10 is comprised within the second voltage range Pl2, and where the demand for power is strictly greater than the low threshold power.

Finally, the management method may comprise a step E7 of transmitting discharge information. For example, said step E7 of transmitting discharge information may be transmitted to a user interface when all the battery cells 30 of a battery module 10 of the plurality of battery modules 10 has a cell voltage lower than a minimum cell voltage. Said minimum cell voltage may for example correspond to a state of charge, that is to say the quantity of energy remaining in the cell, which may be less than 10% or more particularly less than 5%.

According to one embodiment shown in FIG. 6, the management method may be implemented by a strategy algorithm recorded in a memory 2 of the battery management system 3, or in a memory 12 of the module management system 11. The algorithm may in particular be implemented iteratively over a total number "n" of battery cells 30. Thus, and as shown in FIG. 6, steps E3, E4, E5, and E6 may be implemented iteratively for each battery cell 30 denoted "i", so as to supply electrical energy to the external system according to the demand for power received during step E1.

The arrangements previously described make it possible to propose a battery management method capable of placing a battery cell 30 in a discharge situation depending on its cell voltage and the demand for power from an external system which is to be supplied with electrical energy by the energy storage unit 1. Thus, and advantageously, given the presence of two voltage trays for the active material constituting the electrode of the battery cell 30, it is possible to bias the cell battery 30 selectively depending on the voltage tray on which said battery cell 30 is placed at a given time.

The invention claimed is:

1. A battery module (10) comprising a module management system (11) and at least one battery cell (30) having a state of charge which is characterized at least by a cell voltage, said at least one battery cell (30) comprising at least one electrode consisting of at least one active material having an olivine-type structure corresponding to a formula $LiFe_zY_{1-z}PO_4$, where $0<z<1$, and where Y is a chemical element chosen from the group comprising manganese, nickel and cobalt, said at least one active material having a first voltage tray characterized by a first voltage range (P11) corresponding to the electrochemical potentials of the iron atoms in a characteristic curve of this active material linking the specific capacitance to the electrical voltage, and a second voltage tray characterized by a second voltage range (P12) corresponding to the electrochemical potentials of the atoms Y in said characteristic curve, said at least one battery cell (30) being capable of occupying:
- a first operating mode (Mod1) in which the battery cell (30) undergoes a discharge,
- a second operating mode (Mod2) in which the battery cell (30) does not undergo a discharge, the module management system (11) being configured to decide to place the battery cell (30) selectively in an operating mode chosen from among said first and second operating modes (Mod1, Mod2) depending if the cell voltage of said at least one battery cell (30) corresponds to a voltage comprised within the first voltage range (P11), or corresponds to a voltage comprised within the second voltage range (P12), and depending on the type of demand for energy.

2. The battery module (10) according to claim 1, wherein the first voltage range (P11) is comprised between 3.2 V and 3.6 V with respect to the reference potential constituted by the electrochemical couple $Li^+/Li$, and more particularly comprised between 3.3 V and 3.5 V with respect to the reference potential constituted by the electrochemical couple $Li^+/Li$, and wherein the second voltage range (P12) is comprised between 3.7 V and 4.3 V with respect to the reference potential constituted by the electrochemical couple $Li^+/Li$, and more particularly comprised between 3.8 V and 4.1 V with respect to the reference potential constituted by the electrochemical couple $Li^+/Li$.

3. The battery module (10) according to claim 1, wherein the module management system (11) is configured to measure the cell voltage of the battery cell (30).

4. The battery module (10) according to claim 1, wherein the module management system (11) is configured to measure a state of health (SoH) level of the battery cell (30), the module management system (11) being further configured to decide to place said battery cell (30) selectively in an operating mode chosen from among said first and second operating modes (Mod1, Mod2) depending on said state of health (SoH) level of the battery cell (30).

5. The battery module (10) according to claim 1, comprising a plurality of battery cells (30), wherein each battery cell (30) has an individual cell voltage distinct from the cell voltages of the other battery cells (30), the module management system (11) being configured to decide to place each battery cell (30) of the plurality of battery cells (30) selectively in an operating mode chosen from among said first and second operating modes (Mod1, Mod2) depending on the individual cell voltage of this battery cell (30).

6. The battery module (10) according to claim 5, wherein the module management system (11) is configured to decide to place each battery cell (30) selectively in an operating mode chosen from among the first and second operating modes (Mod1, Mod2) depending on a strategy algorithm recorded in a memory (12) of the module management system (11).

7. An energy storage unit (1) comprising at least two battery modules (10) according to claim 1, and a battery management system (3) configured to control each of the module management systems (11) of said at least two battery modules (10), depending on a demand for power coming from an external system.

8. A method for managing an energy storage unit (1) according to claim 7, the management method comprising:
a step (E1) of receiving a demand for power coming from an external system;
a step (E3) of determining, for at least one battery cell (30) among said at least one battery cell (30), a cell voltage of this battery cell (30);
a step (E6) of biasing this battery cell (30) selectively in a first operating mode (Mod1) in which the battery cell (30) undergoes a discharge, or in a second operating mode (Mod2) in which the battery cell (30) does not undergo a discharge, depending on the demand for power and the cell voltage of this battery cell (30).

9. The management method according to claim 8, wherein the first voltage range (P11) is comprised between 3.2 V and 3.6 V with respect to the reference potential constituted by the electrochemical couple $Li^+/Li$, and more particularly comprised between 3.3 V and 3.5 V with respect to the reference potential constituted by the electrochemical couple $Li^+/Li$, and wherein the second voltage range (P12) is comprised between 3.7 V and 4.3 V with respect to the reference potential constituted by the electrochemical couple $Li^+/Li$, and more particularly comprised between 3.8 V and 4.1 V with respect to the reference potential constituted by the electrochemical couple $Li^+/Li$.

10. The management method according to claim 8, further comprising a step (E5) of comparing the demand for power with a predetermined high threshold power, and with a predetermined low threshold power, the biasing step (E6) further comprising the following steps:
placing the battery cell (30) in the first operating mode (Mod1) in the case where the cell voltage of the battery cell (30) corresponds to a voltage which is comprised within the first voltage range (P11), and where the demand for power is greater than or equal to the high threshold power;
placing the battery cell (30) in the first operating mode (Mod1) in the case where the cell voltage of the battery cell (30) corresponds to a voltage which is comprised within the second voltage range (P12), and where the demand for power is strictly comprised between the high threshold power and the low threshold power;
placing the battery cell (30) in the second operating mode (Mod2) otherwise.

11. The management method according to claim 8, further comprising a step (E4) of measuring a state of health (SoH) level of the at least one battery cell (30), the biasing step (E6) being implemented depending on the state of health (SoH) level of the battery cell (30).

12. The management method according to claim 8, wherein one battery module (10) of the plurality of battery modules (10) comprises a plurality of battery cells (30), wherein each battery cell (30) has an individual cell voltage distinct from the cell voltages of the other battery cells (30), the biasing step (E6) being implemented for all or part of the battery cells (30) of said plurality of battery cells (30), depending on the demand for power, and the individual cell voltage of each battery cell (30).

13. The management method according to claim 8, wherein the battery modules (10) of the plurality of battery modules (10) whose number is greater than or equal to two, are divided into a first group of battery modules (Gr1) and into a second group of battery modules (Gr2), each group of battery modules (Gr1, Gr2) comprising at least one of the plurality of battery modules (10), the energy storage (1) further comprising a battery management system (3) configured to control each module management system (11), the management method comprising a step (E2) of selecting a group of battery modules (Gr1, Gr2) from among the first and second groups of battery modules (Gr1, Gr2), wherein only one of the first group of battery modules (Gr1) or the second group of battery modules (Gr2) implements the biasing step (E6).

14. The management method according to claim 13, further comprising the following steps, implemented by the battery management system (3):
a step (E14) of receiving a state of health level of the first group of battery modules (Gr1);
a step (E15) of receiving a state of health level of the second group of battery modules (Gr2);
the step (E2) of selecting a group of modules being implemented depending on said states of health of the first and second groups of battery modules (Gr1, Gr2).

15. The management method according to claim 13, wherein each module management system (11) is configured to measure a state of health (SoH) level of a battery module (10) which is comprised in the energy storage unit (1), the management method comprising:

a step (E11) of determining a state of health (SoH) level of at least one battery module (10) of the first group of battery modules (Gr1), implemented by each module management system (11) of the first group of battery modules (Gr1) on each battery module (10) of the first group of battery modules (Gr1);

a step (E12) of determining a state of health (SoH) level of at least one battery module (10) of the second group of battery modules (Gr2), implemented by each module management system (11) of the second group of battery modules (Gr2) on each battery module (10) of the second group of battery modules (Gr2);

a step (E13) of transmitting said states of health determined by said module management systems (11) to the battery management system (3).

* * * * *